(12) United States Patent
Schreibman

(10) Patent No.: US 11,553,274 B2
(45) Date of Patent: Jan. 10, 2023

(54) AUTOREGRESSIVE BASED RESIDUAL ECHO SUPPRESSION

(71) Applicant: GM GLOBAL TECHNOLOGY OPERATIONS LLC, Detroit, MI (US)

(72) Inventor: Amos Schreibman, Hod Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 17/034,846

(22) Filed: Sep. 28, 2020

(65) Prior Publication Data

US 2022/0103938 A1 Mar. 31, 2022

(51) Int. Cl.
*H04R 3/02* (2006.01)
*G10L 21/0232* (2013.01)
*G10L 21/0216* (2013.01)
*G10L 21/0208* (2013.01)

(52) U.S. Cl.
CPC ............ *H04R 3/02* (2013.01); *G10L 21/0232* (2013.01); *G10L 2021/02082* (2013.01); *G10L 2021/02163* (2013.01)

(58) Field of Classification Search
CPC . G10L 2021/02163; G10L 2021/02082; G10L 21/0232; H04M 9/08; H04R 2499/13

USPC .................... 381/93, 94.1, 94.7, 95, 96, 323
See application file for complete search history.

(56) References Cited

U.S. PATENT DOCUMENTS 9,858,944 B1* 1/2018 Malik ................. G10L 21/0208
2005/0058278 A1* 3/2005 Gallego Hugas ..... H04M 9/082
379/406.01

* cited by examiner

*Primary Examiner* — Yosef K Laekemariam
(74) *Attorney, Agent, or Firm* — Lorenz & Kopf, LLP

(57) ABSTRACT

The present application relates to a system and method for providing autoregressive based residual echo suppression in the STFT domain in a bidirectional vehicle communications system including receiving, from a communications processor, a speaker signal for coupling to a speaker, receiving, from a microphone, a microphone signal wherein the microphone signal includes a voice signal and a residual echo signal, transforming the signals to the STFT domain generating an estimated power spectral density of the residual echo signal in response to a prior power spectral density of a prior residual echo signal, isolating the voice signal from the microphone signal by multiplying the estimated residual echo gain generated using the estimated power spectral density of the residual echo signal with the microphone signal, transforming the signals back to the time domain and coupling the voice signal to the communications processor.

18 Claims, 5 Drawing Sheets

AUTOREGRESSIVE BASED RESIDUAL ECHO SUPPRESSION

BACKGROUND

The present disclosure relates generally to programming motor vehicle audio and sound suppression systems. More specifically, aspects of this disclosure relate to systems, methods and devices for autoregressive based residual echo suppression in the Short Time Fourier Transform (STFT) domain by performing an algorithm for suppression of residual echo in reverberant environments based on auto regressive model of signal energy decay.

Vehicle subsystems typically include noise and vibration constraints in order to reduce cabin noise and increase occupant comfort. For example, a rear differential control module may have noise and vibration constraints that lock clutches to avoid gear rattle or limit torque to avoid hypoid gear noises. In addition, vehicle cabin systems may monitor cabin noises and then generate noise cancelling sound waves or noise masking sounds to cover undesirable vehicle noises. Vehicle audio systems may increase in volume as the vehicle speed increases. Fans and other heating and air conditioning systems may change speeds when a mobile phone call is received by the vehicle communications systems.

To provide an effective hands-free telecommunications system in a vehicle, cabin noise must be reduced as much as possible to increase intelligibility of the phone conversation. In addition, an acoustic echo canceler (AEC) is a necessary component for a full-duplex hands-free telecommunication system to eliminate undesired echo signals that result from acoustic coupling between a loudspeaker and a microphone. In a reverberant acoustic environment, linear echo cancellation is unable to remove all echo components due to the long tail of the room impulse response and computation limitations. A nonlinear residual echo suppressor is additionally needed in order to achieve acceptable levels of echo. The above information disclosed in this background section is only for enhancement of understanding of the background of the invention and therefore it may contain information that does not form the prior art that is already known in this country to a person of ordinary skill in the art.

SUMMARY

Disclosed herein are vehicle sensor systems, vehicle user interface systems and related control logic for provisioning vehicle user interface systems, methods for making and methods for operating such systems, and motor vehicles equipped with user interface systems. By way of example, and not limitation, there is presented a user interface system for predicting proximate vehicle behavior, predicting an increased probability of a vehicle to vehicle contact event, and displaying an indication of the increased probability with the associated proximate vehicle.

In accordance with an aspect of the present disclosure, an apparatus including a telecommunications processor for generating a speaker signal, a speaker for receiving the speaker signal from the telecommunications processor and broadcasting the speaker signal within a vehicle cabin, a microphone for detecting a microphone signal within the vehicle cabin, wherein the microphone signal includes a voice signal and a residual echo signal, a signal processor configured for receiving the speaker signal from the telecommunications processor, the microphone signal from the microphone, generating an estimated power spectral density of the residual echo signal in response to a prior power spectral density of a prior residual echo signal, isolating the voice signal from the microphone signal by mixing the estimated power spectral density of the residual echo signal with the microphone signal; and coupling the voice signal to the telecommunications processor.

In accordance with another aspect of the present disclosure, wherein the power spectral density of the residual echo signal is estimated using an autoregression algorithm.

In accordance with another aspect of the present disclosure, wherein the microphone signal further includes a reflection of the speaker signal and wherein an acoustic echo cancellation algorithm is used to suppress the reflection of the speaker signal in the microphone signal in response to the speaker signal.

In accordance with another aspect of the present disclosure, wherein the telecommunications processor and signal processor form part of a vehicle cabin hands free telecommunications system.

In accordance with another aspect of the present disclosure, wherein a higher order autoregressive model is used to generate the estimated power spectral density of the residual echo signal.

In accordance with another aspect of the present disclosure, wherein the residual echo signal is generated in response to a reverberation of the speaker signal within a vehicle cabin.

In accordance with another aspect of the present disclosure, wherein the voice signal is isolated in response to an estimated power spectral density of the speaker signal and an estimated power spectral density of the residual echo signal and at least one prior value of the estimated power spectral density of the residual echo signal.

In accordance with another aspect of the present disclosure, a method including receiving, from a communications processor, a speaker signal for coupling to a speaker, receiving, from a microphone, a microphone signal wherein the microphone signal includes a voice signal and a residual echo signal, generating an estimated power spectral density of the residual echo signal in response to a prior power spectral density of a prior residual echo signal, isolating the voice signal from the microphone signal by using the estimated power spectral density of the residual echo signal to estimate a gain which multiplies the microphone signal, and coupling the voice signal to the communications processor.

In accordance with another aspect of the present disclosure, wherein the power spectral density of the residual echo signal is estimated using an autoregression algorithm.

In accordance with another aspect of the present disclosure, wherein the microphone signal further includes a reflection of the speaker signal and wherein an acoustic echo cancellation algorithm is used to suppress the reflection of the speaker signal in the microphone signal in response to the speaker signal.

In accordance with another aspect of the present disclosure, wherein the communications processor forms part of a vehicle cabin hands free telecommunications system.

In accordance with another aspect of the present disclosure, wherein a higher order autoregressive model is used to generate the estimated power spectral density of the residual echo signal.

In accordance with another aspect of the present disclosure, wherein the residual echo signal is generated in response to a reverberation of the speaker signal within a vehicle cabin.

In accordance with another aspect of the present disclosure, wherein the estimated power spectral density of the residual echo signal is determined in response to the speaker signal and the microphone signal and at least one prior value of the estimated power spectral density of the residual echo signal.

In accordance with another aspect of the present disclosure wherein the voice signal is isolated in response to an estimated power spectral density of the speaker signal and an estimated power spectral density of the residual echo signal and at least one prior value of the estimated power spectral density of the residual echo signal.

In accordance with another aspect of the present disclosure wherein the method is performed by a digital signal processor as part of a bidirectional telecommunications system.

In accordance with another aspect of the present disclosure wherein the voice signal is not used in estimating the power spectral density of the residual echo signal.

In accordance with another aspect of the present disclosure, a hands-free telecommunications system within a vehicle cabin including a telecommunications processor for generating a speaker signal for broadcast by a speaker within the vehicle cabin, a microphone for generating a microphone signal in response to sounds within the vehicle cabin, and a processor for estimating an estimated power spectral density of the residual echo signal in response to a prior power spectral density of a prior residual echo signal, isolating a voice signal from the microphone signal by using the estimated power spectral density of the residual echo signal to estimate a gain which multiplies with the microphone signal and coupling the voice signal to the telecommunications processor.

In accordance with another aspect of the present disclosure wherein the estimated power spectral density of the residual echo signal is determined in response to the speaker signal and the microphone signal and at least one prior value of the estimated power spectral density of the residual echo signal.

In accordance with another aspect of the present disclosure wherein the voice signal is isolated in response to an estimated power spectral density of the speaker signal and an estimated power spectral density of the residual echo signal and at least one prior value of the estimated power spectral density of the residual echo signal.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
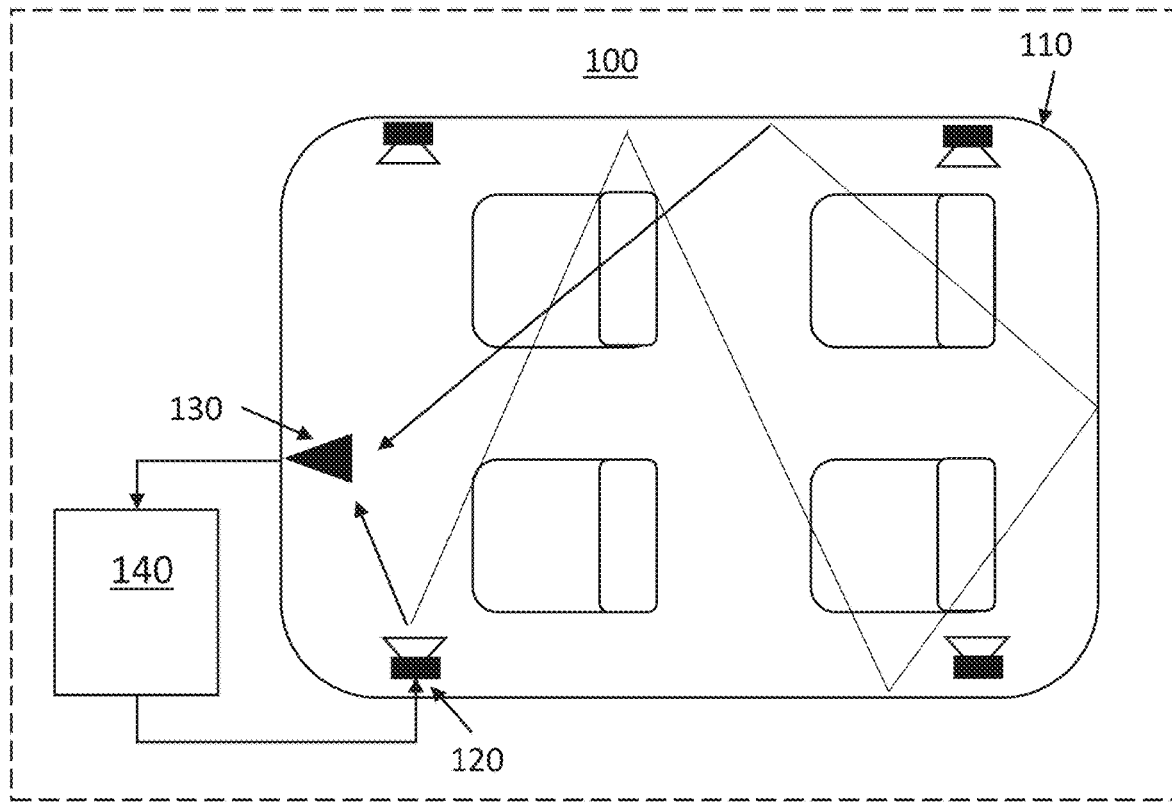
FIG. 1A shows an operating environment for providing autoregressive based residual echo suppression in a bidirectional vehicle communications system according to an exemplary embodiment.

FIG. 1A is illustrative of an exemplary environment 100 for providing autoregressive based residual echo suppression in a bidirectional vehicle communications system. In the exemplary vehicle cabin 110, a speaker 120 is configured to receive an incoming portion of an audio conversation from a communications system 140 and to broadcast the incoming portion within the vehicle cabin 110. The microphone 130 is operative to receive an outgoing portion of an audio conversation and to transmit this outgoing portion to the communications system 140 for transmission via a wireless network, such as a cellular telephone network or the like.

Feedback or echo suppression is an important feature of a bidirectional communications system in order to reduce feedback from the speaker 120 to the microphone 130 as well as to increase intelligibility of the conversation to the listeners. Echo cancellation typically involved recognizing the transmitted signal in an outgoing signal path as it is received by microphone 130 and then subtracting it from the incoming signal path before it is coupled to the transmitter communications system 140. This configuration is operative to prevent the audio signal broadcast by the speaker 120 from being recorded by the microphone 130 thereby reducing echo and/or feedback by the system transmitted back to the communications system 140.

Residual Echo suppression is desirable in a hands-free telecommunications system in order to achieve acceptable echo levels in handsfree teleconferencing systems. Usually spectral subtraction methods are applied in the STFT domain in order to eliminate the residual echo. The residual echo power spectral density (PSD) is typically employed in order to be applied in spectral subtraction algorithm. Estimating the residual echo PSD is performed by measuring the cross correlation between the reference and residual echo signals. When a desired speaker is also present on the input signal, it can introduce bias to the cross-correlation measure, thereby causing distortion in the desired signal.

Traditionally the correlation between the reference and the residual echo signals is measured and used to estimate the levels of remaining echo levels in the noisy signal. Since the desired signal can also appear during the correlation estimation, this method might introduce distortion when a desired signal is present. The proposed system and method are configured to model the energy decay of the residual signal in the STFT domain as an auto regressive process and estimate the current value depending only on past estimation values, thereby avoiding the desired signal distortion problem. In signal processing, an autoregressive process uses previous values of a variable to estimate a current value of the variable.

Figure 1B:
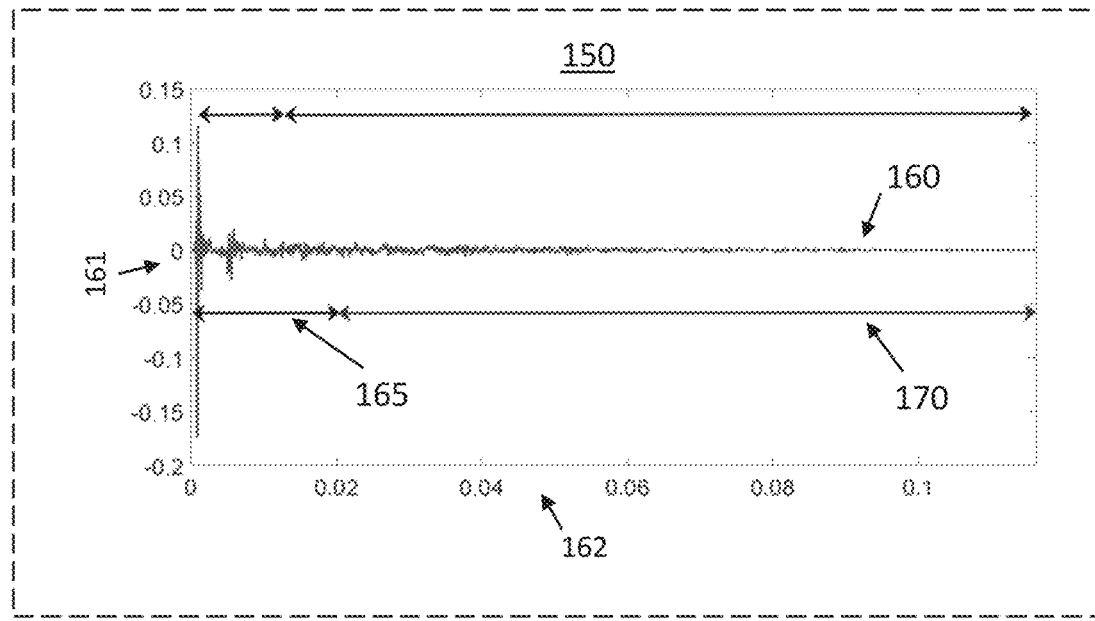
FIG. 1B is illustrative of an exemplary reverberant signal in a vehicle cabin according to an exemplary embodiment.

FIG. 1B is a graph 150 illustrative of an exemplary reverberant impulse response between speaker 120 and microphone 130 in a vehicle cabin. The graph 150 is illustrative of an acoustic amplitude level 160 at a microphone shown as amplitude 161 over time 162. In addition, the graph 150 is illustrative of a typical frame size 165 compared to time and a late reverberation handling time 170. In prior systems, the late reverberation response may go unhandled. In an exemplary embodiment, the currently proposed system of configured to address the late reverberation response by estimating the energy of late reverberation response in the vehicle cabin using autoregression techniques to reduce the uncancelled echo on audio system input without distorting the desired driver signal.

Figure 2:
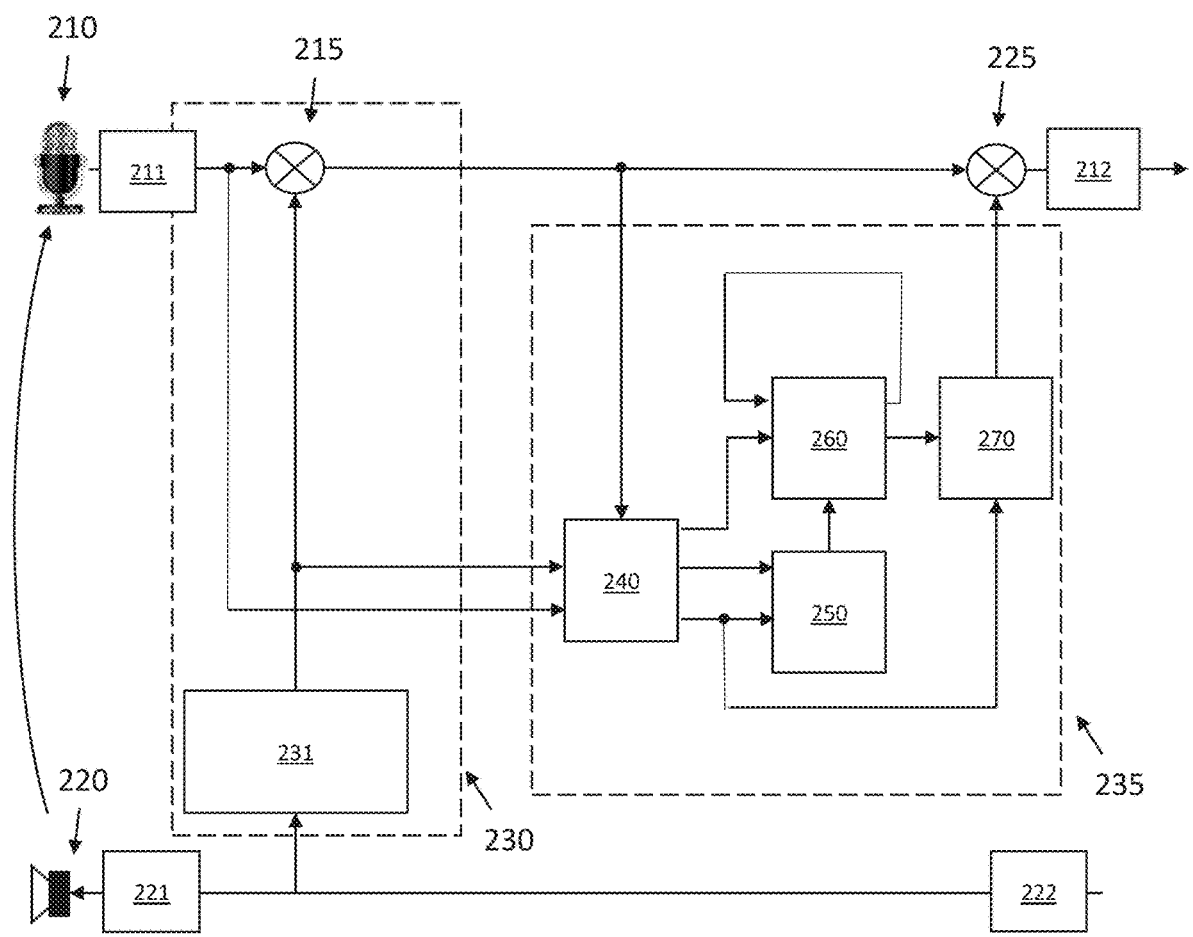
FIG. 2 shows a block diagram illustrating an exemplary system for providing autoregressive based residual echo suppression in a bidirectional vehicle communications system according to an exemplary embodiment.

Turning now to FIG. 2, a block diagram illustrating an exemplary implementation of a system 200 for providing autoregressive based residual echo suppression in the STFT domain in a bidirectional vehicle communications system is shown. The system 200 may include a microphone 210, a speaker 220, a first mixer 215, a second mixer 225, an acoustic echo cancellation (AEC) block 230, a power spectral density (PSD) Estimator 240, a residual PSD estimation block 260, a G 270, and an Autoregression (AR) coefficient estimator 250. The exemplary system 200 is configured for estimating the energy of uncancelled echo in the car cabin, the energy estimation is used to reduce the uncancelled echo on the microphone lines without distorting the desired driver signal. The energy decay of the uncancelled echo is modeled as an autoregressive process in the time/frequency domain, thereby allowing for more exact estimation with no direct relation between desired signal, e.g. driver signal. Thus, when removing the undesired echo, the desired signal is not harmed. Enhance call quality for calls between occupants and car external callers.

In this exemplary embodiment, the microphone 210 and the speaker 220 are located within a vehicle passenger cabin as part of a bidirectional communications system, such as a hand free telecommunications system. In some instances, the microphone 210 may receive not only the desired voice of the speaker, but also any sound being transmitted by the speaker 220, thereby resulting in an undesirable echo and/or feedback. To address this problem, the exemplary system 200 includes a STFT domain AEC block 230, including an echo estimation block 231, to cancel an initial or linear portion of the echo received at the microphone, and a residual echo suppression block (RES) 235, for removing residual echoes to improve performance stability. The echo signal is may be caused by the far speaker, or the voice signal received by the telecommunications processor for broadcast within the vehicle cabin, over the loudspeaker then picked up by the microphone, Thus, the echo suppression system is configured to attenuate this echo while not hampering the in car talker signal, then transmit it back to the far talker to hear.

3) The AEC (which is a prior art block) inputs are both the microphone signal and the loudspeaker signals. It uses the two signals to estimate the echo signal then subtract it from the microphone signal, this generates the residual echo signal which is input to the RES block. The RES block 235 handles the late reverberation present during the later portion of the processing time period.

The RES block 235 may be composed of four main processing blocks, a PSD Estimator 240, an EST Res PSD block 260, a gain block (G) 270, and an AR Coeff estimator 250. The PSD estimator 240 is configured to receive the AEC input signal (Y(n,k)) from the microphone 210, the AEC error signal (E(n,k)) from the first mixer 215 and the AEC estimated echo signal (Ŷ(n,k)) from the AEC block 230. The PSD estimator 240 uses these signals to generate a Øee, Øyy, and Øŷŷ Where $\phi_{xx}$—represents PSD of x signal:

$$\phi_{ee}(n,k) = \lambda \phi_{ee}(n-1,k) + (1-\lambda)|E|^2$$

$$\phi_{yy}(n,k) = \lambda \phi_{yy}(n-1,k) + (1-\lambda)|Y|^2$$

$$\phi_{\hat{y}\hat{y}}(n,k) = \lambda \phi_{\hat{y}\hat{y}}(n-1,k) + (1-\lambda)|\hat{Y}|^2$$

The reverberant room Impulse Response model suggests exponentially signal decay $$h(n) = b(n)e^{-\rho n/f_s}$$

This can be used to represent the residual signal energy decay in the STFT domain $$\phi_{yy}(n, k) = a(k)\underbrace{\phi_{yy}(n-1, k)}_{reverberant} + \underbrace{\phi_{\hat{y}\hat{y}}(n, k)}_{direct}$$

Y—AEC input signal and Ŷ—AEC Estimated Echo Signal. Since the residual echo PSD $\phi_{ee}(n,k) = \phi_{yy}(n,k) - \phi_{\hat{y}\hat{y}}(n,k)$ â(k) can be estimated using $$\operatorname{argmin}\left\{\sum_n |\phi_{ee}(n, k) - \hat{a}(k)\phi_{yy}(n-1, k)|^2\right\} \Rightarrow$$

Where $$\hat{a}(k) = \frac{\sum_n \phi_{ee}(n, k)\phi_{yy}(n-1, k)}{\sum_n \phi_{yy}(n-1, k)\phi_{yy}(n-1, k)}$$

The AR parameters may be assumed to change slowly over time and therefore can be estimated when the desired speaker is not present in the input signal. The residual echo PSD is estimated using only the AR model parameters and the previous values of the estimation. Since no direct connection to the desired speech exists, no distortion is expected.

The AR coefficient estimator is configured to receive $$\phi_{ee}(n,k) = \lambda \phi_{ee}(n-1,k) + (1-\lambda)|E|^2$$

$$\phi_{yy}(n,k) = \lambda \phi_{yy}(n-1,k) + (1-\lambda)|Y|^2$$

and estimate $$\hat{a}(k) = \frac{\sum_n \phi_{ee}(n,k)\phi_{yy}(n-1,k)}{\sum_n \phi_{yy}(n-1,k)\phi_{yy}(n-1,k)}$$

The residual estimated PSD block 260 is configured to receive $$\hat{a}(k) = \frac{\sum_n \phi_{ee}(n,k)\phi_{yy}(n-1,k)}{\sum_n \phi_{yy}(n-1,k)\phi_{yy}(n-1,k)}$$

and $$\phi_{\hat{y}\hat{y}}(n,k) = \lambda\phi_{\hat{y}\hat{y}}(n-1,k) + (1-\lambda)|\hat{Y}|^2$$

and the iterative value of $$\hat{\phi}_{yy}(n,k) = \hat{\phi}_{\delta\delta}(n,k) + \phi_{\hat{y}\hat{y}}(n,k)$$

to estimate the residual PSD $\phi_{\delta\delta}$ where $\phi_{\delta\delta}$ is equal to $$\hat{\phi}_{\delta\delta}(n,k) = \hat{a}(k)\hat{\phi}_{yy}(n-1,k)$$

The gain block then receives $\phi_{ee}$ and $\phi_{\delta\delta}$ to estimate $$\hat{G}(n,k) = \frac{\phi_{ee}(n,k) - \hat{\phi}_{\delta\delta}(n,k)}{\phi_{ee}(n,k)};$$

where $$\text{Out}(n,k) = \hat{G}(n,k)E(n,k)$$

where Out(n,k) is output to the telecommunications voice processor. In one exemplary embodiment, the output of the RES block 235 may be a scalar gain which multiplies the residual echo signal to result in the clean signal. This gain may be calculated by using the estimated residual echo PSD and the residual echo PSD using some algorithm such as a Wiener filter in the STFT domain.

In an exemplary embodiment, the autoregressive based residual echo suppression is performed in the Short Time Fourier Transform (STFT) domain. The exemplary system may include STFT blocks 211, 222 to convert the incoming time domain signals to the STFT domain and ISTFT blocks 212, 221 to convert the outgoing signals back to the time domain.

Figure 3:
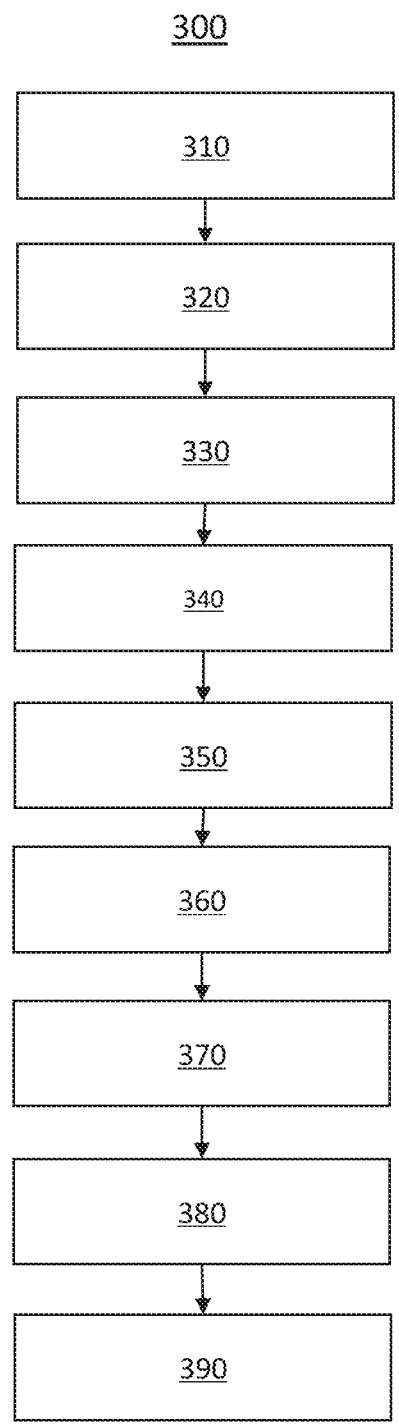
FIG. 3 shows a flow chart illustrating an exemplary method for providing autoregressive based residual echo suppression in a bidirectional vehicle communications system according to another exemplary embodiment.

Turning now to FIG. 3, a flow chart illustrating an exemplary implementation of a method 300 for providing autoregressive based residual echo suppression in a bidirectional vehicle communications system is shown is shown in the STFT domain. Initially, the method is first operative for receiving 310 a speaker signal intended to be broadcast into a vehicle cabin and the microphone signals 330 transmitted back to the communication system and transform them to the STFT domain. The speaker signal may be generated by a telecommunications system processor or other communications processor. The speaker signal may convey information that is part of a bidirectional electronic voice communication.

The method is next operative to determine 320 an AEC estimated echo signal from the speaker and microphone signals. The AEC estimated echo signal may be indicative of a portion of the speaker signal that is to be attenuated if coupled back into the microphone of the telecommunications system. the linear portion of the echoes and reverberation. The method next receives 330 the microphone signal indicative of sounds from within the vehicle cabin including a voice signal and the reverberant speaker signal. The reverberant speaker signal may include a directly coupled representation of the speaker signal broadcast by a speaker within the vehicle cabin as well as reflected representations of the speaker signal reflected from one or more surface within the vehicle cabin. These reflected representations may be time delayed and non-linear as compared to the directly coupled representation.

Next, an AEC error output signal is generated in response to the microphone signal and the AEC estimated echo signal. The AEC estimated echo signal used to identify the detected speaker signal within the microphone and to attenuate the speaker signal such that primarily only the desired voice signal is coupled to telecommunications transmitter. The AEC error output signal may contain only the voice signal and the reverberant portion of the speaker signal. It is desirable to remove the reverberant portion of the speaker signal to further increase clarity of the voice signal for transmission by the telecommunications system.

To suppress the remaining speaker signal from the microphone signal, the method is configured for estimated the residual echo energy by using auto regressive model for energy decay. For example, the method may employ a higher order auto regressive model to suppress the residual echo energy. To achieve this, the method is first operative to estimate 350 the power spectral density (PSD) in response to the unaltered microphone signal, the AEC error output signal and the AEC estimated echo signal generated. The estimated residual echo PSD is then used to estimate 360 the auto regressive coefficient.

The residual echo PSD is then estimated 370 in response to the estimated auto regressive coefficient, the estimated PSD and one or more prior estimated values of the residual PSD. The residual echo PSD may be estimated as follows:

$$\widetilde{\phi_{\delta\delta}}(n,k) = a\widetilde{\phi_{yy}}(n-1,k)$$

$$\widetilde{\phi_{yy}}(n,k) = \widetilde{\phi_{\delta\delta}}(n,k) + \phi_{\hat{y}\hat{y}}(n,k)$$

Using an autoregressive technique employing one or more prior estimated values of the PSD, the energy decay of the remaining echo may be modeled as an autoregressive process in the time/frequency domain, to improve the residual PSD estimation with no direct relation to the desired output signal.

The residual PSD along with the estimated PSD are applied to a Wiener filter algorithm to generate 270 the estimated residual echo gain (G) signal. The estimated residual echo gain (G) signal is then applied to the AEC error output signal via the second mixer 225 to generate the output signal to be coupled to the telecommunications system processor and transmitter.

Figure 4:
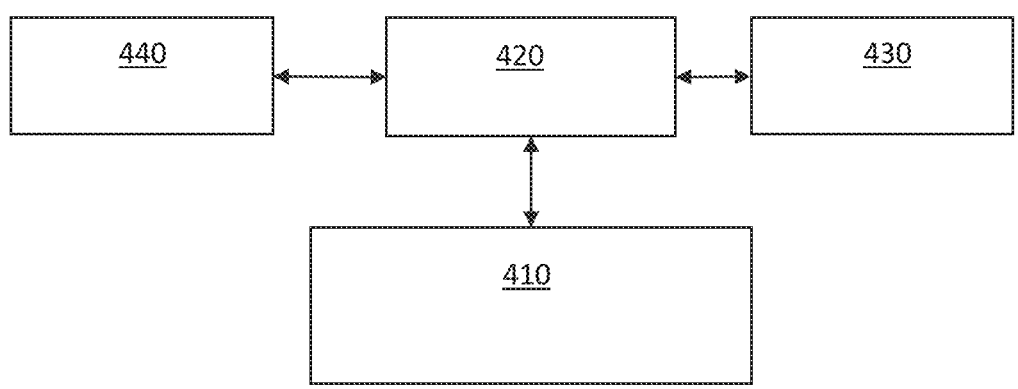
FIG. 4 shows a block diagram illustrating another exemplary system for providing autoregressive based residual echo suppression in a bidirectional vehicle communications system according to another exemplary embodiment.

The output signal is then transformed back to the time domain via ISTFT block to produce the telecommunication system input Turning now to FIG. 4, a block diagram illustrating another exemplary implementation of a system 400 for providing autoregressive based residual echo suppression in a bidirectional vehicle communications system is shown. The exemplary system 400 may form a vehicle cabin hands free telecommunications system including a telecommunications processor 410, a signal processor 420, a speaker 430, and a microphone 440. wherein the telecommunications processor and signal processor form part of The telecommunications processor 410 is operative to process signals received via a wireless network, such as from a cellular telephone or data network, and to prepare signals for transmission via a wireless network. The telecommunications processor 410 is further configured for generating a speaker signal representative of an audio signal, for coupling to a speaker 430 or the like for broadcasting within a vehicle cabin. The telecommunications processor 410 may further receive audio signals from a microphone 440 or signal processor 420 coupled to a microphone 440.

A speaker 430 is configured for receiving the speaker signal from the telecommunications processor 410 and broadcasting the speaker signal within a vehicle cabin. The microphone 440 is for detecting a microphone signal within the vehicle cabin, wherein the microphone signal includes a voice signal and a echo signal resulting from a reverberation, or reflection, of the speaker signal broadcast by the speaker 430 within the vehicle cabin. The microphone signal may include a reflection of the speaker signal and wherein an acoustic echo cancellation algorithm is used to suppress the reflection of the speaker signal in the microphone signal in response to the speaker signal.

The signal processor 420 may be a digital signal processor, audio processor, or the like, configured for receiving the speaker signal from the telecommunications processor 410, the microphone signal from the microphone 430, generating an estimated power spectral density of the residual echo signal in response to a prior power spectral density of a prior residual echo signal. In one example, the power spectral density of the residual echo signal is estimated using an autoregression algorithm. For example, a higher order autoregressive model may be used to generate the estimated power spectral density of the residual echo signal. The residual echo signal may be generated in response to a reverberation of the speaker signal within a vehicle cabin.

The signal processor 420 is then operative for isolating the voice signal from the microphone signal by multiplying the estimated residual echo gain generated using the estimated power spectral density of the residual echo signal with the microphone signal; and coupling the voice signal to the telecommunications processor 410. In one example, the voice signal, may be isolated in response to an estimated power spectral density of the speaker signal and an estimated power spectral density of the residual echo signal and at least one prior value of the estimated power spectral density of the residual echo signal.

In an exemplary embodiment, the system may be a hands-free telecommunications system within a vehicle cabin including a telecommunications processor 410 for generating a speaker signal for broadcast by a speaker 430 within the vehicle cabin, a microphone 430 for generating a microphone signal in response to sounds within the vehicle cabin, and a processor 420 for estimating an estimated power spectral density of the residual echo signal in response to a prior power spectral density of a prior residual echo signal, isolating a voice signal from the microphone signal by multiplying the estimated residual echo gain generated using the estimated power spectral density of the residual echo signal with the microphone signal and coupling the voice signal to the telecommunications processor. In this exemplary embodiment, the estimated power spectral density of the residual echo signal is determined in response to the speaker signal and the microphone signal and at least one prior value of the estimated power spectral density of the residual echo signal. Additionally, the voice signal may be isolated in response to an estimated power spectral density of the speaker signal and an estimated power spectral density of the residual echo signal and at least one prior value of the estimated power spectral density of the residual echo signal.

Figure 5:
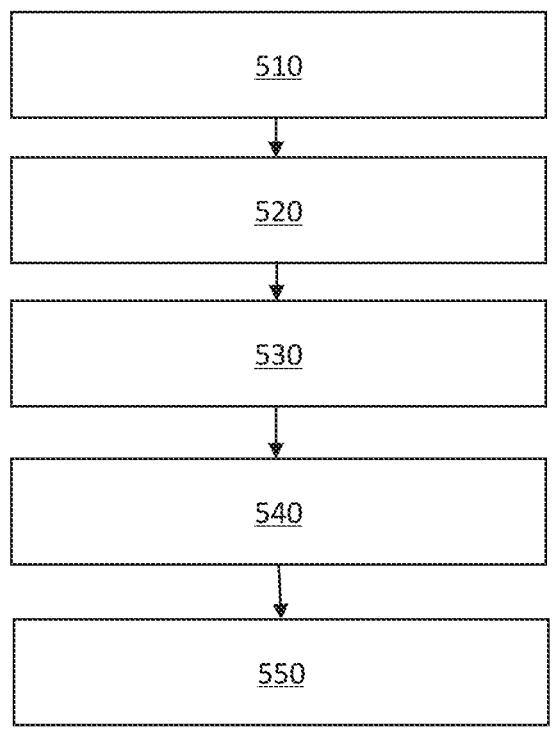
FIG. 5 shows a flow chart illustrating another exemplary method for providing autoregressive based residual echo suppression in a bidirectional vehicle communications system according to another exemplary embodiment.

Turning now to FIG. 5, a flow chart illustrating an exemplary implementation of a system 500 for providing autoregressive based residual echo suppression in a bidirectional vehicle communications system is shown. The exemplary method 500 is first operative for receiving 510, from a communications processor, a speaker signal for coupling to a speaker. The speaker signal may be representative of an incoming portion of a bidirectional telecommunications communication. The method is next operative for receiving 520, from a microphone, a microphone signal wherein the microphone signal includes a voice signal and a residual echo signal. The residual echo signal may be generated in response to a reverberation of the speaker signal within a vehicle cabin. Thus, the microphone signal may include a reflection of the speaker signal and wherein an acoustic echo cancellation algorithm in the STFT domain is used to suppress the reflection of the speaker signal in the microphone signal in response to the speaker signal.

The exemplary method then generates 530 an estimated power spectral density of the residual echo signal in response to a prior power spectral density of a prior residual echo signal. The power spectral density of the residual echo signal may be estimated using an autoregression algorithm. A higher than 1 order autoregressive model is used to generate the estimated power spectral density of the residual echo signal. The estimated power spectral density of the residual echo signal may also be determined in response to the speaker signal and the microphone signal and at least one prior value of the estimated power spectral density of the residual echo signal. In one exemplary embodiment, the voice signal may be isolated in response to an estimated power spectral density of the speaker signal and an estimated power spectral density of the residual echo signal and at least one prior value of the estimated power spectral density of the residual echo signal. In an autoregressive configuration, the voice signal is not used in estimating the power spectral density of the residual echo signal.

The method is next configured for isolating 540 the voice signal from the microphone signal by multiplying the estimated residual echo gain generated using the estimated power spectral density of the residual echo signal with the microphone signal. The isolate voice signal is then transformed back to the time domain via ISTFT transform then coupled 550 to the communications processor. the communications processor forms part of a vehicle cabin hands free telecommunications system While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a telecommunications processor for generating a speaker signal;

a speaker for receiving the speaker signal from the telecommunications processor and broadcasting the speaker signal within a vehicle cabin;

a microphone for detecting a microphone signal within the vehicle cabin, wherein the microphone signal includes a voice signal and a residual echo signal, wherein the residual echo signal is generated in response to a reverberation of the speaker signal within a vehicle cabin; and a signal processor configured for receiving the speaker signal from the telecommunications processor, the microphone signal from the microphone, generating an estimated power spectral density of the residual echo signal in response to a prior power spectral density of a prior residual echo signal, isolating the voice signal from the microphone signal by mixing the estimated power spectral density of the residual echo signal with the microphone signal; and coupling the voice signal to the telecommunications processor.

2. The apparatus of claim 1, wherein the power spectral density of the residual echo signal is estimated using an autoregression algorithm.

3. The apparatus of claim 1, wherein the microphone signal further includes a reflection of the speaker signal and wherein an acoustic echo cancellation algorithm is used to suppress the reflection of the speaker signal in the microphone signal in response to the speaker signal.

4. The apparatus of claim 1, wherein signal processor is further configured for transforming the speaker signal and the microphone signal into a Short Time Fourier Transform domain speaker signal and a Short Time Fourier Transform microphone signal.

5. The apparatus of claim 1, wherein a higher order autoregressive model is used to generate the estimated power spectral density of the residual echo signal.

6. The apparatus of claim 1, wherein the voice signal is isolated in response to an estimated power spectral density of the speaker signal and an estimated power spectral density of the residual echo signal and at least one prior value of the estimated power spectral density of the residual echo signal.

7. A method comprising:

receiving, from a communications processor, a speaker signal for coupling to a speaker;

receiving, from a microphone, a microphone signal wherein the microphone signal includes a voice signal and a residual echo signal, wherein the residual echo signal is generated in response to a reverberation of the speaker signal within a vehicle cabin;

generating an estimated power spectral density of the residual echo signal in response to a prior power spectral density of a prior residual echo signal;

isolating the voice signal from the microphone signal by mixing the estimated power spectral density of the residual echo signal with the microphone signal; and coupling the voice signal to the communications processor.

8. The method of claim 7, wherein the power spectral density of the residual echo signal is estimated using an autoregression algorithm.

9. The method of claim 7, wherein the microphone signal further includes a reflection of the speaker signal and wherein an acoustic echo cancellation algorithm is used to suppress the reflection of the speaker signal in the microphone signal in response to the speaker signal.

10. The method of claim 7, further including converting the speaker signal into a Short Time Fourier Transform speaker signal and converting the microphone signal into a Short Time Fourier Transform microphone signal.

11. The method of claim 7, wherein a higher order autoregressive model is used to generate the estimated power spectral density of the residual echo signal.

12. The method of claim 7, wherein the estimated power spectral density of the residual echo signal is determined in response to the speaker signal and the microphone signal and at least one prior value of the estimated power spectral density of the residual echo signal.

13. The method of claim 7 wherein the voice signal is isolated in response to an estimated power spectral density of the speaker signal and an estimated power spectral density of the residual echo signal and at least one prior value of the estimated power spectral density of the residual echo signal.

14. The method of claim 7 wherein the method is performed by a digital signal processor as part of a bidirectional telecommunications system.

15. The method of claim 7 wherein the voice signal is not used in estimating the power spectral density of the residual echo signal.

16. A hands-free telecommunications system within a vehicle cabin comprising:

a telecommunications processor for generating a speaker signal for broadcast by a speaker within the vehicle cabin;

a microphone for generating a microphone signal in response to sounds within the vehicle cabin; and a processor for estimating an estimated power spectral density of the residual echo signal in response to a prior power spectral density of a prior residual echo signal, isolating a voice signal from the microphone signal by mixing the estimated power spectral density of the residual echo signal with the microphone signal and coupling the voice signal to the telecommunications processor, wherein the residual echo signal is generated in response to a reverberation of the speaker signal within a vehicle cabin.

17. The hands free telecommunications system within a vehicle cabin of claim 16, wherein the estimated power spectral density of the residual echo signal is determined in response to the speaker signal and the microphone signal and at least one prior value of the estimated power spectral density of the residual echo signal.

18. The hands free telecommunications system within a vehicle cabin of claim 16, wherein the voice signal is isolated in response to an estimated power spectral density of the speaker signal and an estimated power spectral density of the residual echo signal and at least one prior value of the estimated power spectral density of the residual echo signal.

* * * * *